United States Patent
Yeh et al.

(10) Patent No.: US 6,772,424 B2
(45) Date of Patent: Aug. 3, 2004

(54) LOCKING AND EJECTION MECHANISM FOR DISK DRIVE

(75) Inventors: Shih-Lin Yeh, Taoyuan (TW); Han-Chao Chen, Hsinchu (TW); Jui-Nan Chuang, Changhua (TW)

(73) Assignee: Lite-On IT Corp. (TW)

( * ) Notice: Subject to any disclaimer, the term of this patent is extended or adjusted under 35 U.S.C. 154(b) by 316 days.

(21) Appl. No.: 09/978,856

(22) Filed: Oct. 16, 2001

(65) Prior Publication Data

US 2003/0072243 A1 Apr. 17, 2003

(30) Foreign Application Priority Data

Apr. 5, 2001 (TW) .................................... 090207259 U

(51) Int. Cl.⁷ .............................................. C11B 17/04
(52) U.S. Cl. .................................... 720/610; 360/99.06
(58) Field of Search ............................. 369/75.2, 77.1; 360/99.02, 99.06

(56) References Cited

U.S. PATENT DOCUMENTS 5,943,309 A * 8/1999 Watanabe .................. 369/75.1
6,181,663 B1 * 1/2001 Kakuta et al. ............. 369/77.1
6,480,453 B2 * 11/2002 Ahn .......................... 369/75.2
6,603,723 B2 * 8/2003 Minase ...................... 369/75.2

FOREIGN PATENT DOCUMENTS

JP 2001-344864 * 12/2001

* cited by examiner

Primary Examiner—Brian E. Miller
(74) Attorney, Agent, or Firm—Raymond Sun

(57) ABSTRACT

A disk drive has a tray with a chassis secured to the tray, the tray and the chassis being housed inside a housing. The disk drive includes a slide mechanism that is positioned between the chassis and the tray, and which is movable independently from the chassis. The disk drive also includes a locking and ejection mechanism that includes a first part that is secured to the chassis and a second part that is secured to the slide mechanism. The tray is locked inside the housing when the first part and second part engage each other, and the tray is ejected from the housing when engagement between the first part and second part is released.

18 Claims, 12 Drawing Sheets

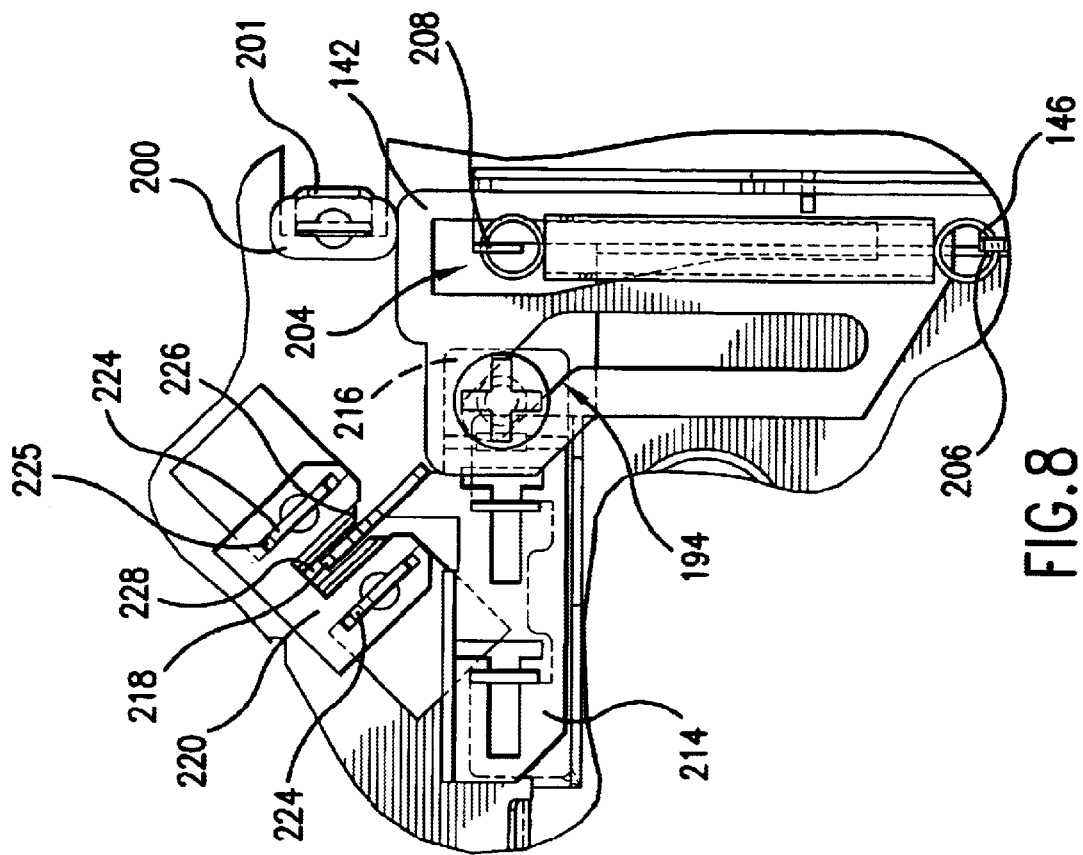
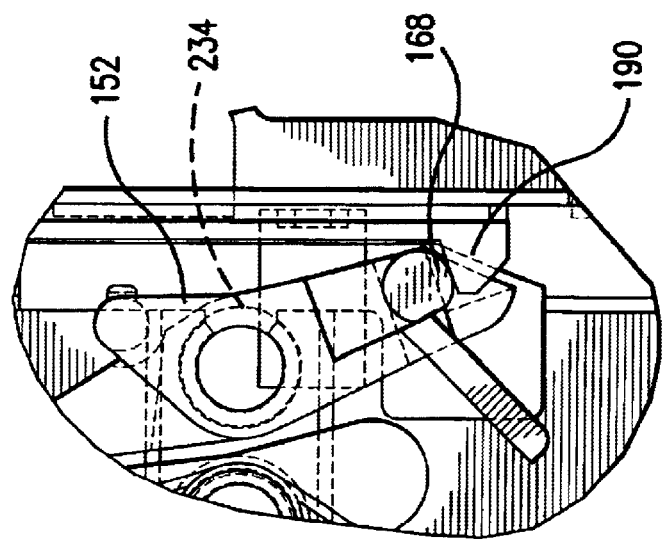

LOCKING AND EJECTION MECHANISM FOR DISK DRIVE

BACKGROUND OF THE INVENTION

1. Field of the Invention

The present invention generally relates to disk drives, and more particularly, to a locking and ejection mechanism for use in a disk drive, the locking and ejection mechanism minimizing vibrations between the tray and the housing when the tray is secured inside the housing during a play mode.

2. Description of the Prior Art

CD-ROM and DVD disk drives are well-known. For example, CD-ROM disk drives are commonly used within a notebook-size personal computer. A CD-ROM is a type of an optical disk which is capable of storing a large amount of data including programs or database data. The CD-ROM, which is placed in the CD-ROM disk drive, is accessed by a laser pickup of the CD-ROM disk drive so that data is reproduced from the CD-ROM.

FIGS. 1A and 1B illustrate a conventional CD-ROM disk drive 20, which includes a tray 22 which is slidably positioned in a housing 23 of the disk drive 20 for reciprocating movement in both an ejecting direction A and an inserting direction B. The housing 23 has a top cover 25 and a bottom cover 28, and the tray 22 includes a chassis 29 that is secured (e.g., by screws) to the bottom of the tray 22. When a disk (not shown) is loaded into the disk drive 20, the tray 22 (with the disk being placed thereon) is manually pushed into the disk drive 20 in the inserting direction B and set at a loaded position in the disk drive 20.

In the disk drive 20, a drive unit (not shown) is provided below the tray 22. A turntable 24 which is rotated by a spindle motor (not shown) is attached to the drive unit, with the disk that is placed on the tray 22 being held on the turntable 24. An optical pickup 26 is coupled to the drive unit for accessing the disk to read out data from the disk.

A locking and ejection mechanism is provided for ejecting the tray 22 from the housing 23. A front bezel 30 is attached to a front end of the tray 22, and includes a rectangular opening which extends laterally in the front bezel 30. An ejection switch 32 is attached to the tray 22 and provided in the rectangular opening of the front bezel 30. When the ejection switch 32 is manually pressed, the tray 22 is ejected from the housing 23 to an ejected position, where the tray 22 at the ejected position can be further pulled out from the housing 23 to a disk-change position by the user. When the tray 22 is set at the disk-change position (as shown in FIG. 1), the tray 22 is completely outside the confines of the housing 23 and the disk on the tray 22 can be removed and replaced with a new one.

A guide rail assembly is provided to guide the movement of the tray 22 in either the inserting direction or the ejecting direction. The guide rail assembly includes a pair of movable rails 34, a pair of guide rails 36, and a pair of slide rails 38. One movable rail 34 is secured to each of the opposing sides of the tray 22 and arranged such that each movable rail 34 is movable with respect to the bottom cover 28. Each guide rail 36 is secured to each of the opposing sides of the bottom cover 28, and each guide rail 36 is arranged on the bottom cover 28 so that the guide rail 36 can extend in directions parallel to the corresponding movable rail 34. Each slide rail 38 is movably arranged between the corresponding movable rail 34 and guide rail 36 so that the slide rail 38 is movable with respect to both the movable rail 34 of the tray 22 and the guide rail 36 of the bottom cover 28. In other words, there is a relative displacement between each set of slide rail 38 and movable rail 34, and between each set of slide rail 38 and guide rail 36. Each set of rails 38+34 and 38+36 slides along its own defined paths.

The disk drive 20 has a locking and ejection mechanism that functions to lock the tray 22 and its play module 40 inside the housing 23 during the play mode, and to eject the tray 22 to the ejected position. Referring to FIGS. 2 and 3, the locking and ejection mechanism has a slide 42 that is attached to the chassis 29. The slide 42 can also move relative to the tray 22 in the directions labeled by the arrows A and B. The locking and ejection mechanism also includes a spring member 44 that has a first or front end 46 that is secured to a portion of the slide 42, and an opposite second or rear end 48 that is secured to the chassis 29. The bias exerted by the spring member 44 ensures that the slide 42 is always pushed in the direction of arrow B. The locking and ejection mechanism also includes a first arm 50 and a second arm 52 that are provided at the front end of the tray 22. The first arm 50 has a generally T-shaped configuration, with a bottom end 54 that is rotatably coupled to a solenoid 56, and an opposing top end 58 that has a protrusion 60 about which a torsion spring 62 is seated. The first arm 50 can pivot about the pivot point 60 defined by the protrusion 60. The second arm 52 has a generally elongated configuration with a side 64 that is adjacent to, and abuts, the top end 58 of the first arm 50. The second arm 52 also has an end 66 that defines a recess. The second arm 52 can pivot about a pivot point 70. A pin 72 is provided on the bottom cover 28, and is normally secured or held inside the recess of the second arm 52 when the tray 22 is secured inside the housing 23 in the play mode.

When the pin 72 is secured inside the recess of the second arm 52, the tray 22 is pushed and locked inside the housing 23 in the play mode. When in the play mode, the tray 22 and chassis 29 are locked inside the housing 23, so that the spring member 44 is stretched. The stretched spring member 44 exerts a bias which biases the slide 42 in the direction of the arrow B.

To release the tray 22 from the play mode to the ejected position, the ejection switch 32 is manually pressed, thereby actuating the solenoid 56, which releases the torsion spring 62 so that the bias of the torsion spring 62 pushes the first arm 50 in a clockwise rotation (as viewed from the top of FIG. 3). The top end 58 of the first arm 50 in turn pushes the side 64 of the second arm 52 in a clockwise rotation, so that the recess is moved clockwise away from its engagement with the pin 72. When the pin 72 is released from the recess of the second arm 52, the natural bias of the spring member 44 will pull the rear end 48 towards the front end 46, pushing the tray 22 out of the housing 23 in the direction of arrow A. FIG. 4 shows the tray 22 in the ejected position, with certain elements (e.g., the solenoid 56) omitted for clarity and illustration purposes. The tray 22 moves relative to the housing 23 along the rails 34, 36 and 38 of the guide rail assembly described above.

Unfortunately, vibrations are commonly experienced by conventional disk drives 20. In particular, the locking point defined by the pin 72 retained in the recess of the second arm 52 contains a moment about which the entire tray 22 can pivot. In addition, since the pin 72 is part of the bottom cover 28, and the second arm 52 is coupled to the chassis 29, any vibrations experienced by the tray 22 when the turntable 24 rotates during the play mode will be transferred via the pin 72 and the bottom cover 28 to the external environment. This external environment can even be the housing of a lap-top or notebook computer if the disk drive 20 is a slim-type optical disk drive. This can lead to undesirable vibrations that can be felt or experienced by the user.

Thus, there remains a need for a locking and ejection mechanism that minimizes the effects of vibrations, and which minimizes the spread of vibrations.

SUMMARY OF THE INVENTION

It is an object of the present invention to provide a locking and ejection mechanism that minimizes the effects of vibrations, and which minimizes the spread of vibrations.

The objects of the present invention may be accomplished by providing a disk drive that has a tray with a chassis secured to the tray, the tray and the chassis being housed inside a housing. The disk drive includes a slide mechanism that is positioned between the chassis and the tray, and which is movable independently from the chassis. The disk drive also includes a locking and ejection mechanism that includes a first part that is secured to the chassis and a second part that is secured to the slide mechanism. The tray is locked inside the housing when the first part and second part engage each other, and the tray is ejected from the housing when engagement between the first part and second part is released. The first and second parts of the locking and ejection mechanism are not coupled to (i.e., they are independent of) the housing, so that the built-up forces (including the normal bias of the ejection forces) that result at the engagement point between the first and second parts will remain internal, and will not be translated to the housing and beyond to the outside environment.

BRIEF DESCRIPTION OF THE DRAWINGS

FIG. 7 is an enlarged sectional view of the region 7—7 in FIG. 6.

FIG. 8 is an enlarged sectional view of the region 8—8 in FIG. 6.

DETAILED DESCRIPTION OF THE PREFERRED EMBODIMENTS

Figure 1A:
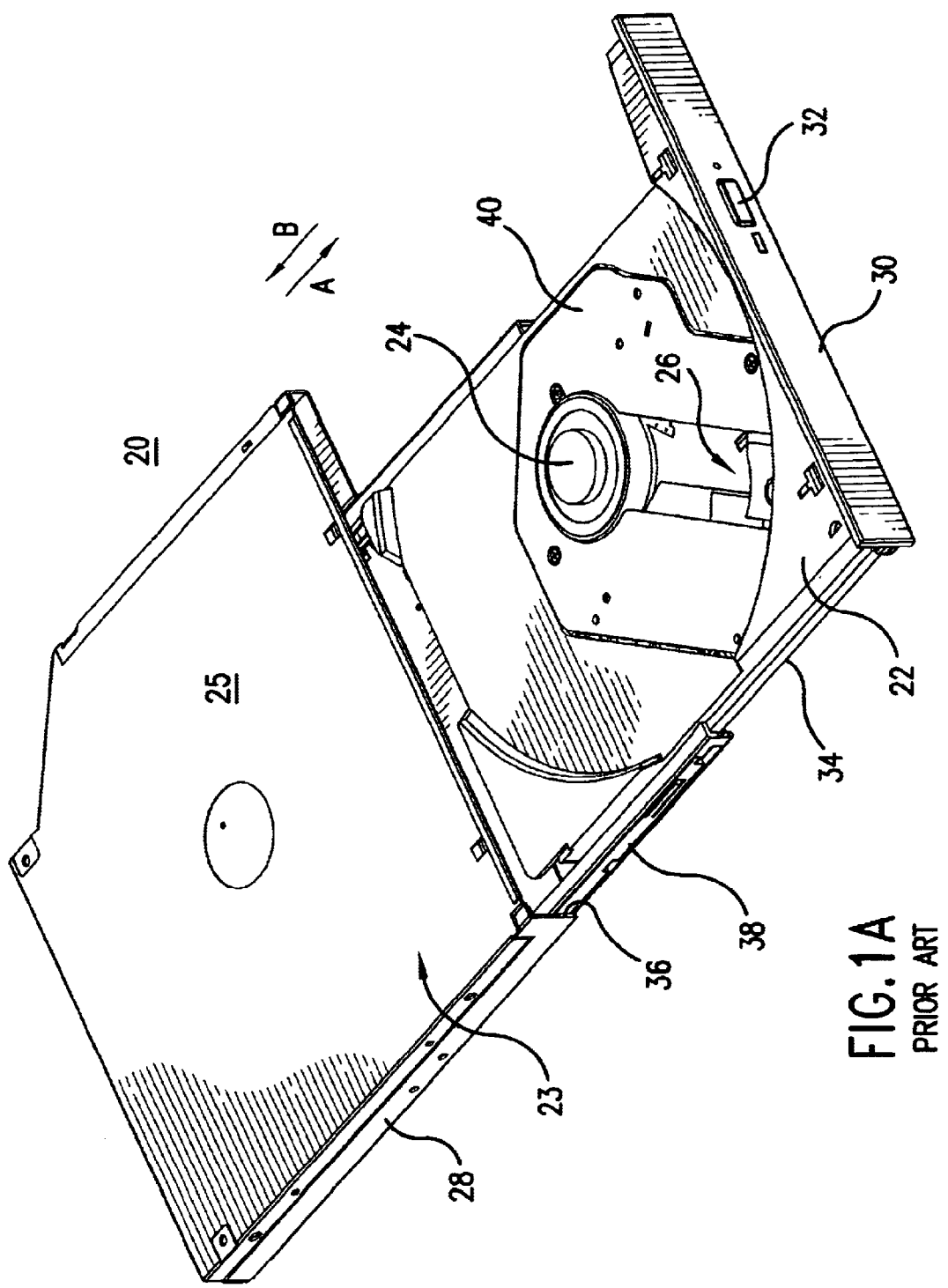
FIG. 1A is a top perspective view of a conventional disk drive.
Figure 1B:
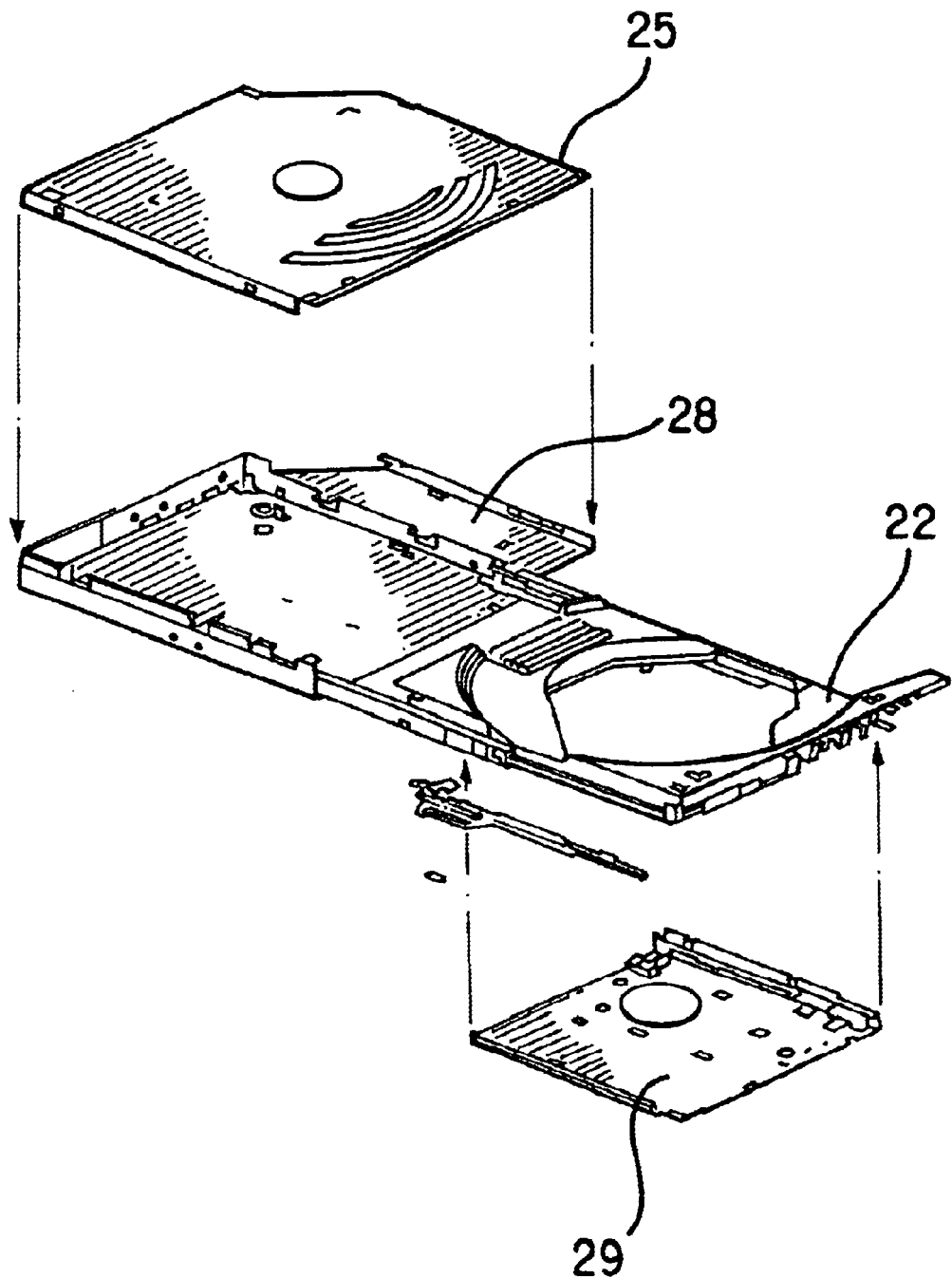
FIG. 1B is an exploded perspective view of the disk drive of FIG. 1A.
Figure 2:
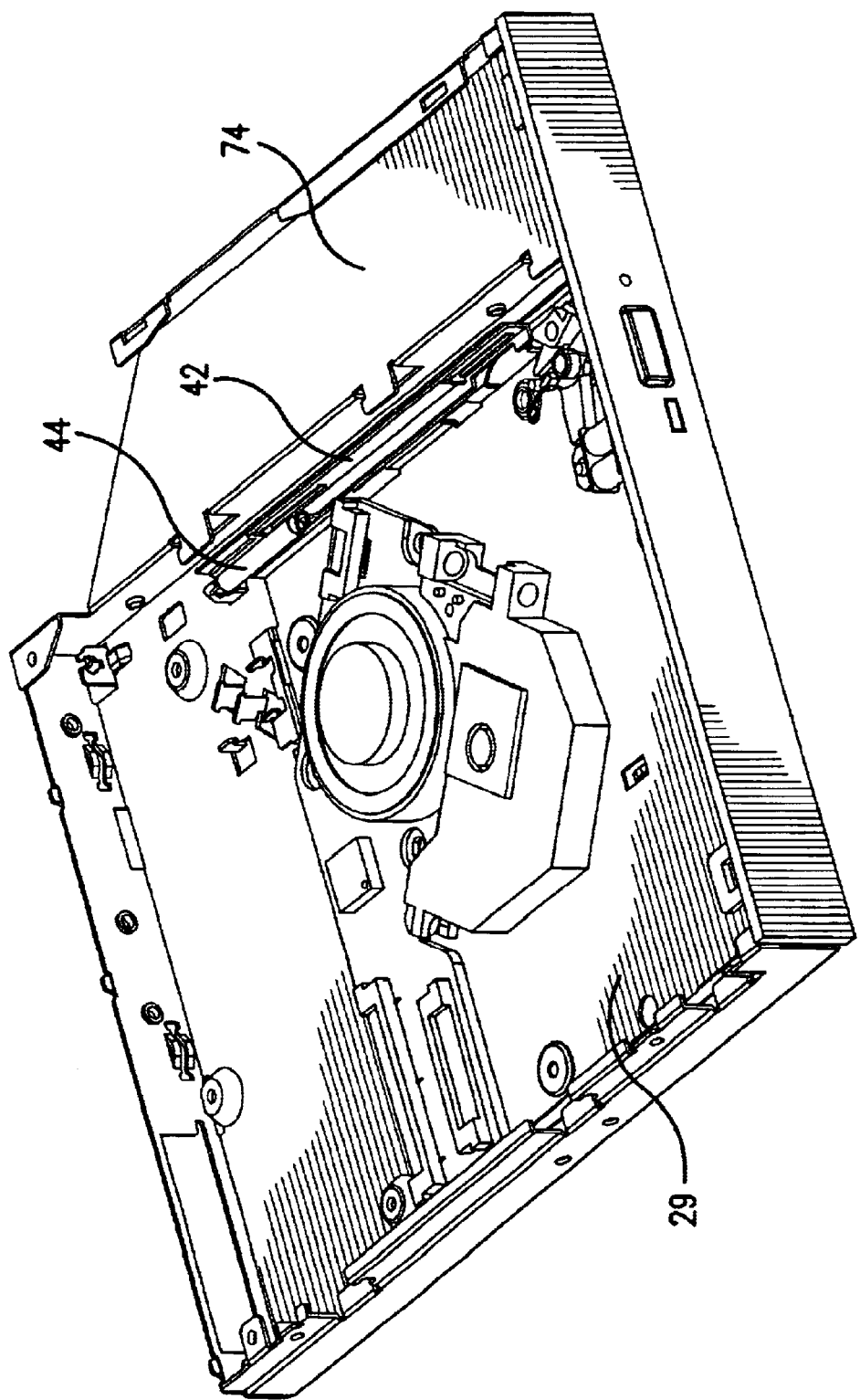
FIG. 2 is top perspective view of the disk drive of FIG. 1 with the top cover removed.
Figure 3:
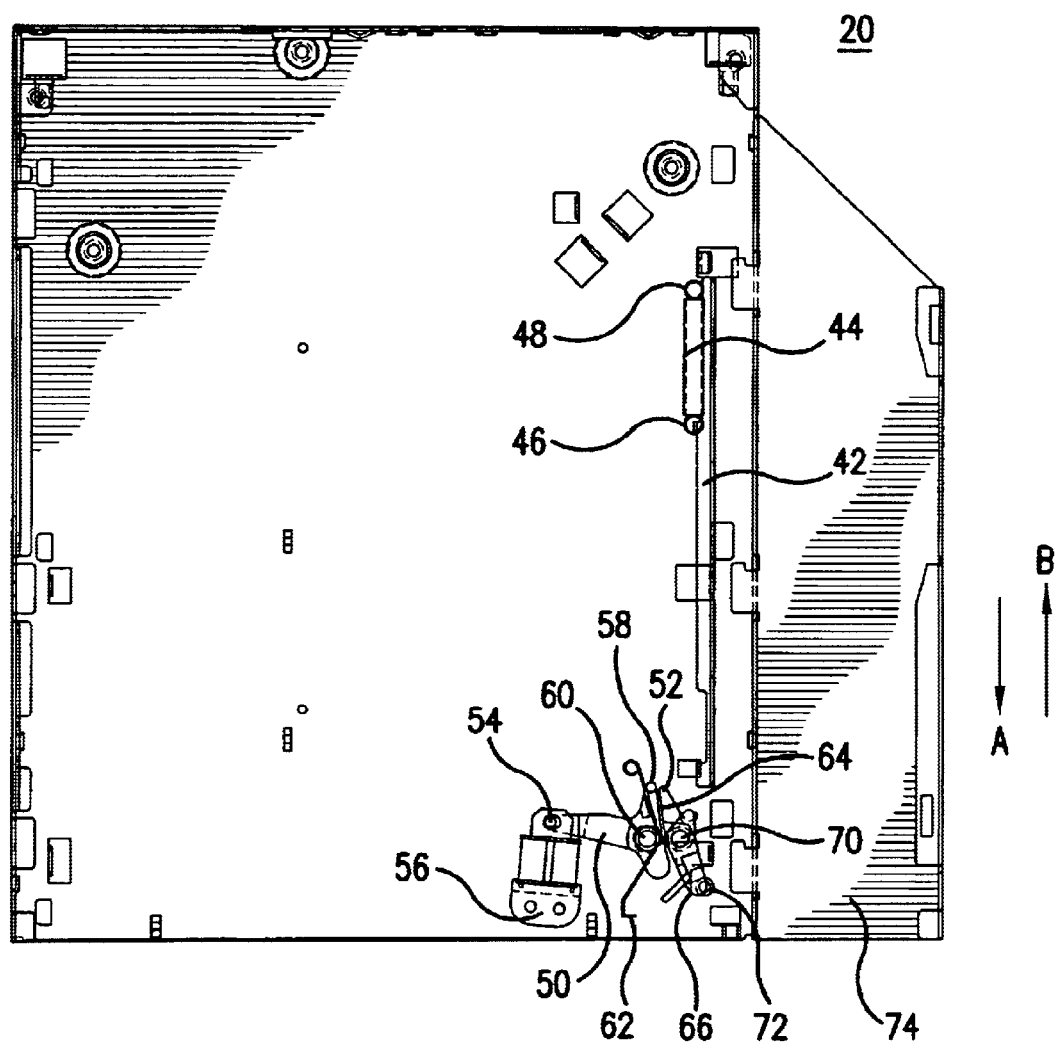
FIG. 3 is top plan view of a portion of the disk drive of FIG. 2 shown with the tray locked in the housing during the play mode.
Figure 4:
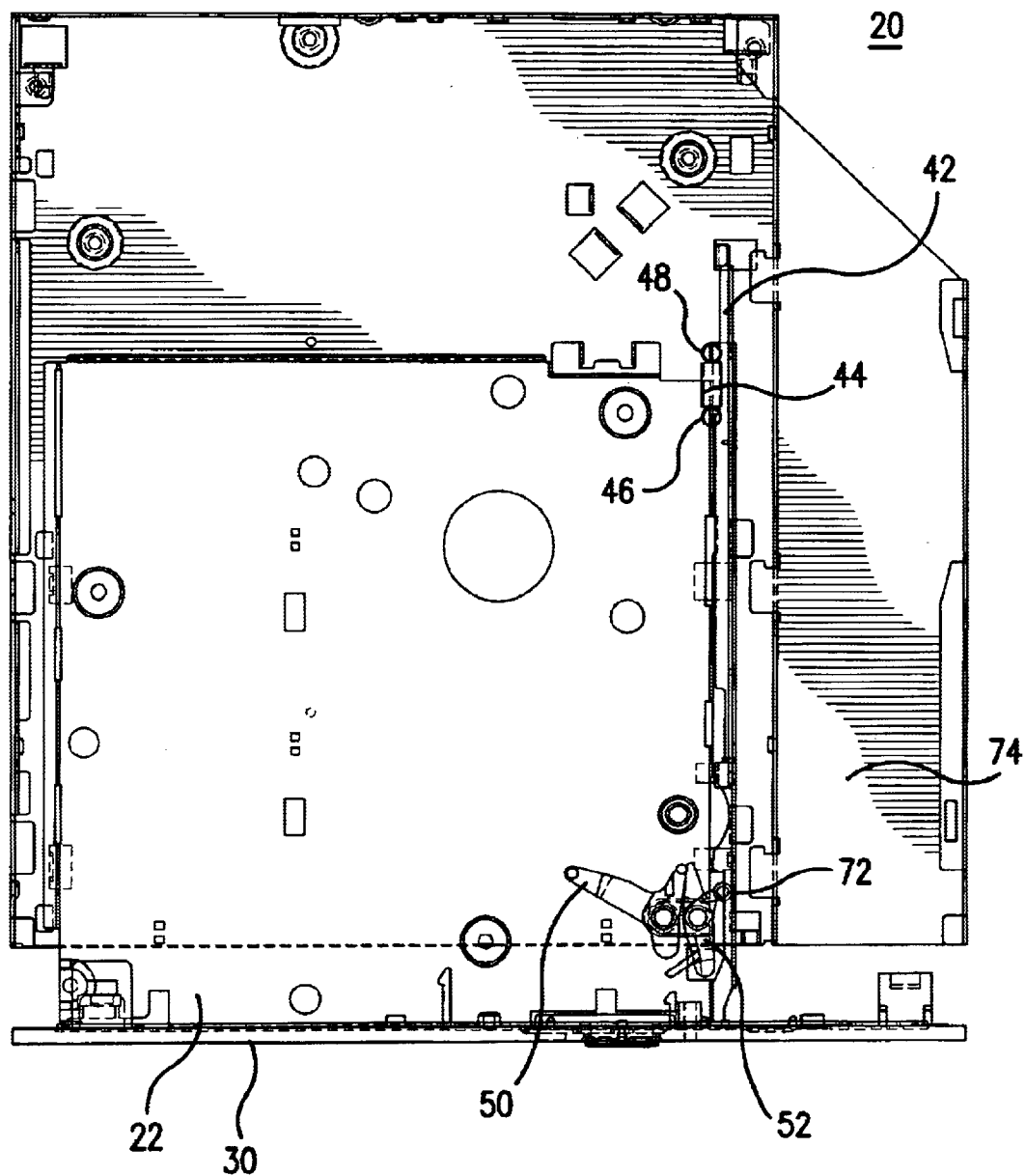
FIG. 4 is top plan view of a portion of the disk drive of FIG. 2 shown with the tray in the ejected position.
Figure 5:
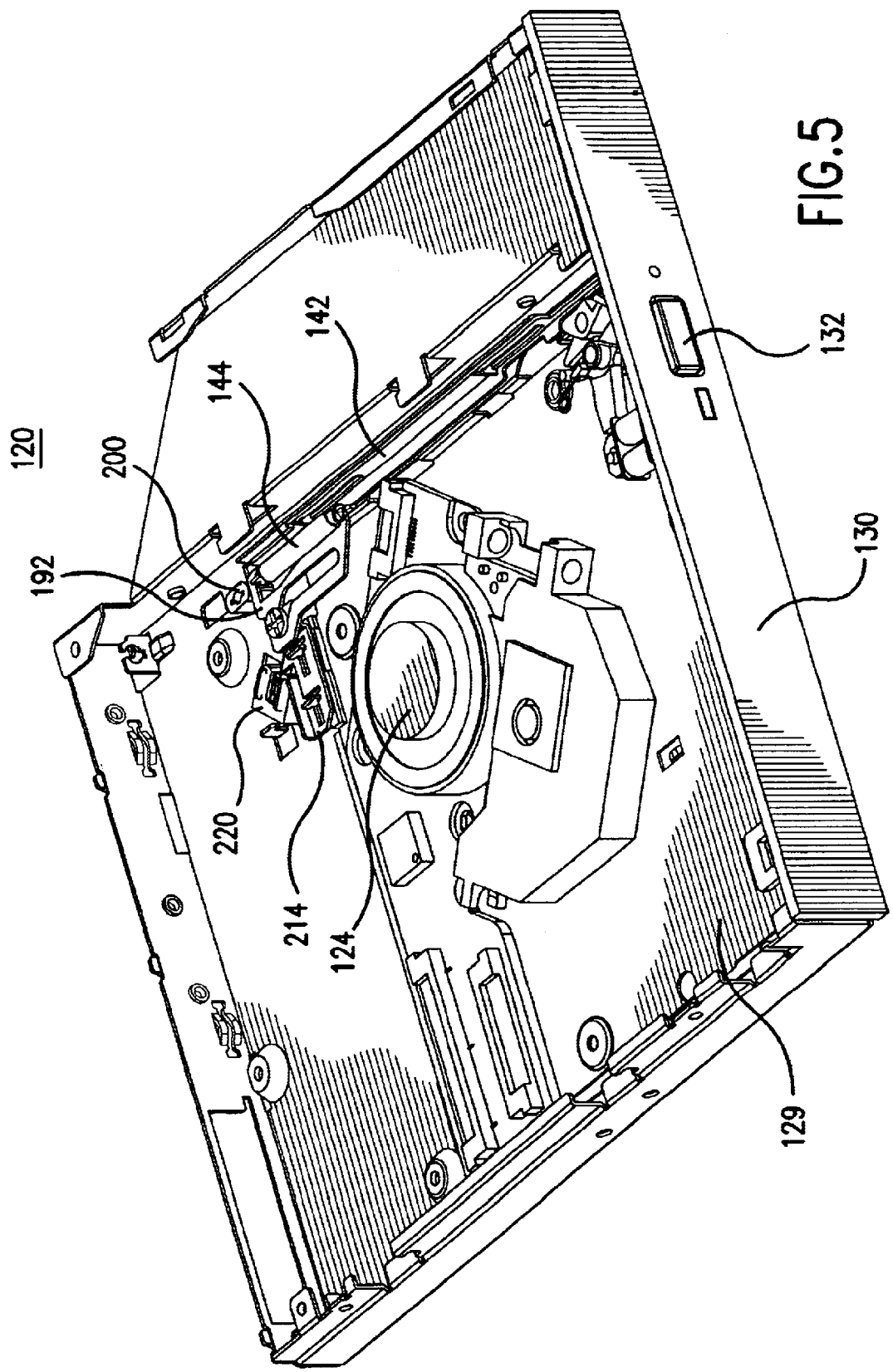
FIG. 5 is a top perspective view of a disk drive according to one embodiment of the present invention shown with the top cover removed.
Figure 6:
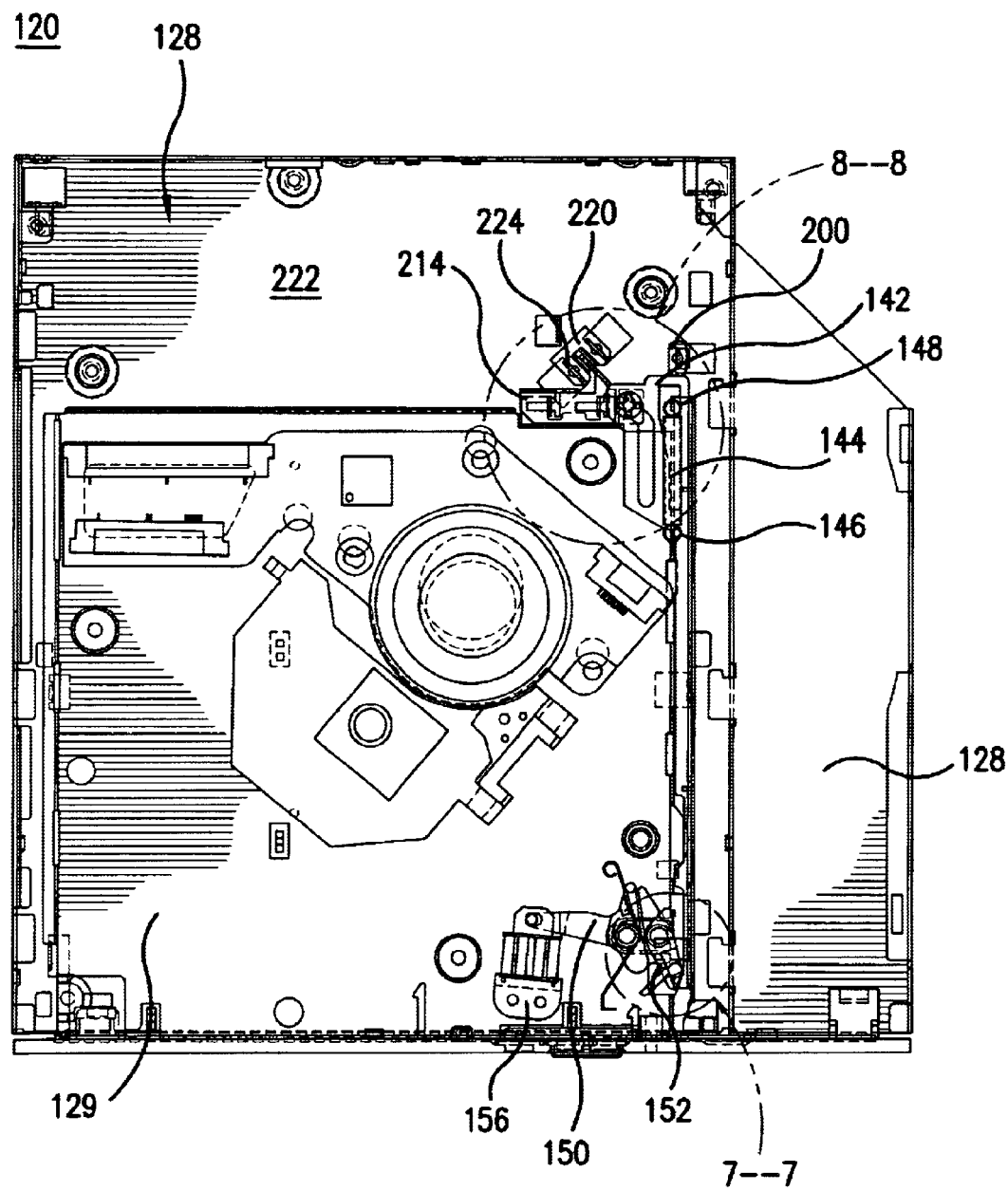
FIG. 6 is a top plan view of the disk drive of FIG. 5.
Figure 9:
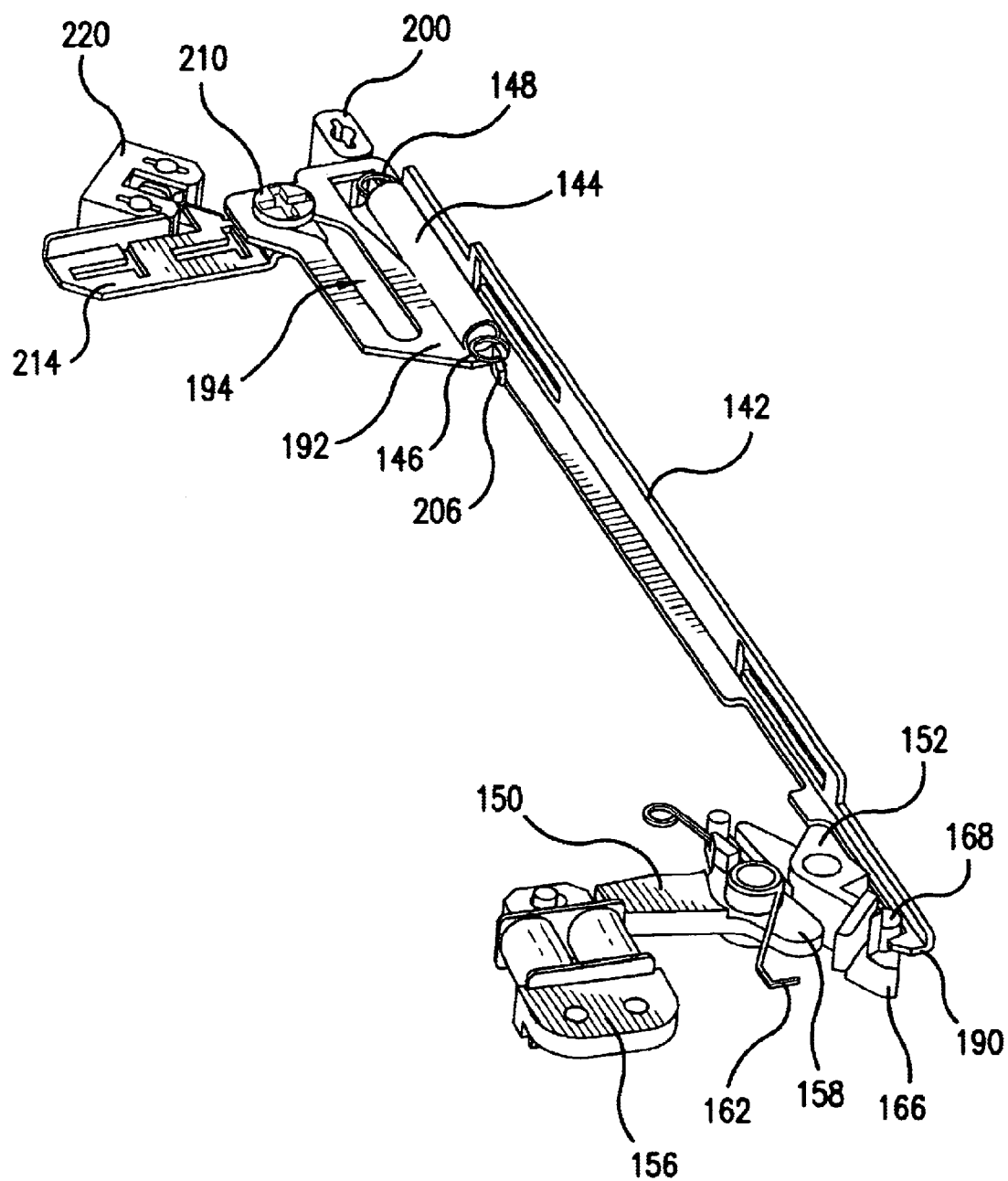
FIG. 9 is an enlarged perspective and isolated view illustrating the components of the locking and ejection mechanism of the disk drive of FIG. 5 when the tray is locked inside the housing.

The following detailed description is of the best presently contemplated modes of carrying out the invention. This description is not to be taken in a limiting sense, but is made merely for the purpose of illustrating general principles of embodiments of the invention. The scope of the invention is best defined by the appended claims. In certain instances, detailed descriptions of well-known devices and mechanisms are omitted so as to not obscure the description of the present invention with unnecessary detail.

The present invention provides a locking and ejection mechanism that minimizes the transfer of vibrations by providing the locking point for the tray at a location that does not directly couple or attach to the housing. As a result, the built-up forces (including the normal bias of the ejection forces) that result at this locking point will remain internal, and will not be translated to the housing 123 and beyond to the outside environment.

It will be appreciated by those skilled in the art that the locking and ejection mechanism of the present invention is applicable to any disk drive. The principles of the present invention are not limited to use with CD-ROM drives and DVD drives. However, the benefits realized by the present invention are especially appropriate for use in slim-type DVD or CD-ROM drives.

FIGS. 5–10 illustrate a disk drive 120 according to one non-limiting embodiment of the present invention. The disk drive 120 has a chassis 129, a bottom cover 128, a turntable 124, an optical pickup, a front bezel 130 (with an ejection switch 132), a play module, and a guide rail assembly that can be the same in construction and operation as the chassis 29, the bottom cover 28, the turntable 24, the optical pickup 26, the front bezel 30, the play module 40, and the guide rail assembly described above for the disk drive 20.

The disk drive 120 has a locking and ejection mechanism that functions to lock the tray 122 and its play module inside the housing 123 during the play mode, and to eject the tray 122 to the ejected position. The locking and ejection mechanism has a slide 142 that is positioned between the tray 122 and the chassis 129 in a manner that allows the slide 142 to move relative to the tray 122 and the chassis 129 in the directions labeled by the arrows A and B. In other words, the slide 142 is not permanently or fixedly coupled to either the chassis 129 or the tray 122, but is movably coupled to the chassis 129 in a manner which allows the slide 142 to reciprocate along a predetermined path between the chassis 129 and the tray 122. Specifically, movement of the slide 142 is restricted by the ears (not shown) of the chassis 129. The slide 142 will usually move in a direction that is opposite to the direction of the movement of the chassis 129. The slide 142 has a hooked end 190 at the front thereof, and a plate 192 that is provided at the rear thereof. A first slot 194 is provided in the plate 192 and functions as a guide slot for a rounded guide element 210. The first slot 194 has a straight section 196 that extends parallel to the slide 142, and an angled section 198 that extends at an angle with respect to the slide 142 towards the rear of the slide 142. An elastic element 200, which can be made from a soft and elastic material such as rubber, is attached to the bottom cover 128 and is adapted to provide a cushioned stop member for the plate 192. The elastic member 200 is received by a guide piece 201 that functions to hold the elastic member 200 and to define a stop point for the plate 192. A second slot 204 extends generally parallel to the straight section 196 of the first slot 194.

The slide 142 can be considered to be a longitudinal slide member. The locking and ejection mechanism also includes a lateral slide member 214 that interacts with the plate 192 of the longitudinal slide member 142. The slide 214 is attached to the rear of the chassis 129, and has a rounded guide element 210 carried on one end 216 of the slide 214. The rounded guide element 210 is retained inside the guide slot 194 of the plate 192 at all times, so as to couple the slide member 142 to the chassis 129 along a predetermined path of travel between the chassis 129 and the tray 122. In this regard, the guide element 210 is adapted to be slid along the guide slot 194 from the angled section 198 to the straight section 196, and vice versa. The slide 214 further includes an elongated guide element 218 that extends at an angle of approximately 45 degrees from the lateral axis defined by the slide 214.

The locking and ejection mechanism also includes another elastic element 220 that is attached to the base 222 of the bottom cover 128. A pair of protrusions 224 are attached to the bottom cover 128, and extend into a pair of corresponding openings 225 in the elastic element 220. Thus, the protrusions 224 function to fix the position of the elastic element 220. The elastic element 220 also has a slot 228, and both the elastic element 220 and its slot 228 can be oriented at the same angle as the elongated guide element 218 so that the slot 228 normally receives and retains the elongated guide element 218 when the tray 122 is locked inside the housing 123 during the play mode. The entrance to the slot 228 that faces the elongated guide element 218 can have angled edges 226 to make it easier for the elongated guide element 218 to enter the slot 228.

The locking and ejection mechanism also includes a spring member 144 that has a first or front looped end 146 that is secured to a portion of the slide 142 (e.g., by latching or hooking the looped end 146 to a post 206 on the slide 142), and an opposite second or rear looped end 148 that is secured to the chassis 129 via the second slot 204 (e.g., by hooking or latching the looped end 148 to a post 208 that extends from the rear of the chassis 129). Thus, the rear portion of the spring member 144 extends over the second slot 204. Connecting one end (e.g., at 148) of the spring member 144 to the chassis 129 and the other end (e.g., at 146) of the spring member 144 to the slide 142 ensures that the slide 142 is always pulled in the direction of arrow B because the spring member 144 will normally bias its two ends together.

The locking and ejection mechanism also includes a first arm 150 and a second arm 152 that are provided at the front end of the tray 122. The first arm 150 has a generally T-shaped configuration, with a bottom end 154 that is rotatably coupled via a post 230 to a solenoid 156, and an opposing top end 158 that has a protrusion 160 around which a torsion spring 162 is seated. The first arm 150 can pivot about the pivot point 160 defined by the protrusion 160. The second arm 152 has a generally elongated configuration with a side 164 that is adjacent to, and abuts, the top end 158 of the first arm 150. The second arm 152 can pivot about a pivot point 170 provided on the chassis 129. The second arm 152 also has an end 166 that has a rounded post 168 positioned adjacent the end 166. The rounded post 168 (which is part of the second arm 152) is normally hooked or engaged with the hooked end 190 of the slide 142 when the tray 122 is secured inside the housing 123 during the play mode. A spring 234 is positioned under the second arm 152 and performs the function of biasing the second arm 152 in a counter-clockwise direction towards the path of the slide 142 and its hooked end 190 to make it easier for the hooked end 190 to engage the post 168, as explained in greater detail below.

FIGS. 5–10 present different views to illustrate the disk drive 120 when in the play mode, with the tray 122 locked inside the housing 123. As can be seen from FIGS. 5–10, the spring member 144 is stretched and exerts a bias which biases the slide 142 in the direction of the arrow B. However, the hooked end 190 on the slide 142 engages the rounded post 168 to overcome the bias of the spring member 144, thereby preventing the tray 122 from sliding out of the housing 123 in the direction of the arrow A. In this locked position, the forces are concentrated at the point or location where the hooked end 190 and the rounded post 168 engage, and these forces translate into an internal force among the chassis 129, the second arm 152 and the slide 142. There is no interactive force between the chassis 129 and the housing 123 because the chassis 129 is isolated from the housing 123. In other words, no vibrations will be transferred or passed between the chassis 129 and the housing 123. The elastic and soft nature of the elastic elements 200 and 220 function to further isolate and minimize vibrations. In addition, the solenoid 156 is normally closed in the locked position and holds the torsion spring 162 against the bias of the torsion spring 162.

To release the tray 122 from the locked position in the play mode to the ejected position, the ejection switch 132 is manually pressed, thereby cutting the supply of electricity (i.e., power) to the solenoid 156, so that the solenoid 156 releases the torsion spring 162. The normal bias of the torsion spring 162 then pushes the first arm 150 in a clockwise rotation (as viewed from the top of FIGS. 10 and 11). The top end 158 of the first arm 150 in turn pushes the side 164 of the second arm 152 in a clockwise rotation (against the normal bias of the spring 234), so that the rounded post 168 is moved clockwise away from its engagement with the hooked end 190. This is shown in FIG. 11. When the hooked end 190 becomes disengaged from the rounded post 168, the natural bias of the spring member 144 will pull the front end 146 towards the rear end 148 to compress the spring member 144, thereby pulling the slide 142 in the direction of the arrow B. This releases the tray 122 from its locked position, and allows the tray 122 to be pulled out of the housing 123 in the direction of the arrow A. The tray 122 moves relative to the housing 123 along the rails of the guide rail assembly described above.

Figure 11:
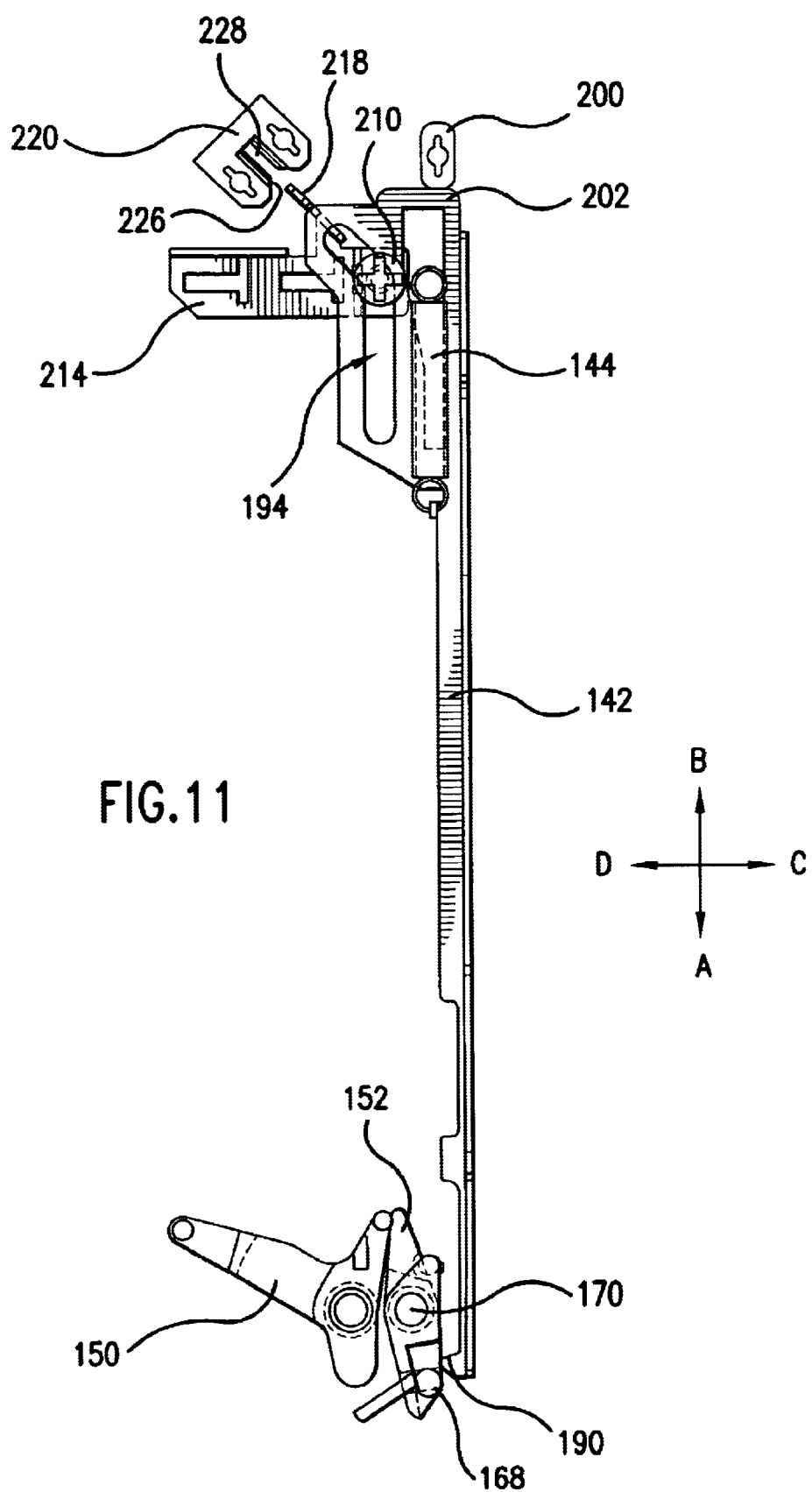
FIGS. 11 and 12 are enlarged top plan isolated views illustrating the components of the locking and ejection mechanism of the disk drive of FIG. 5 as the locking and ejection mechanism is being released.
Figure 12:
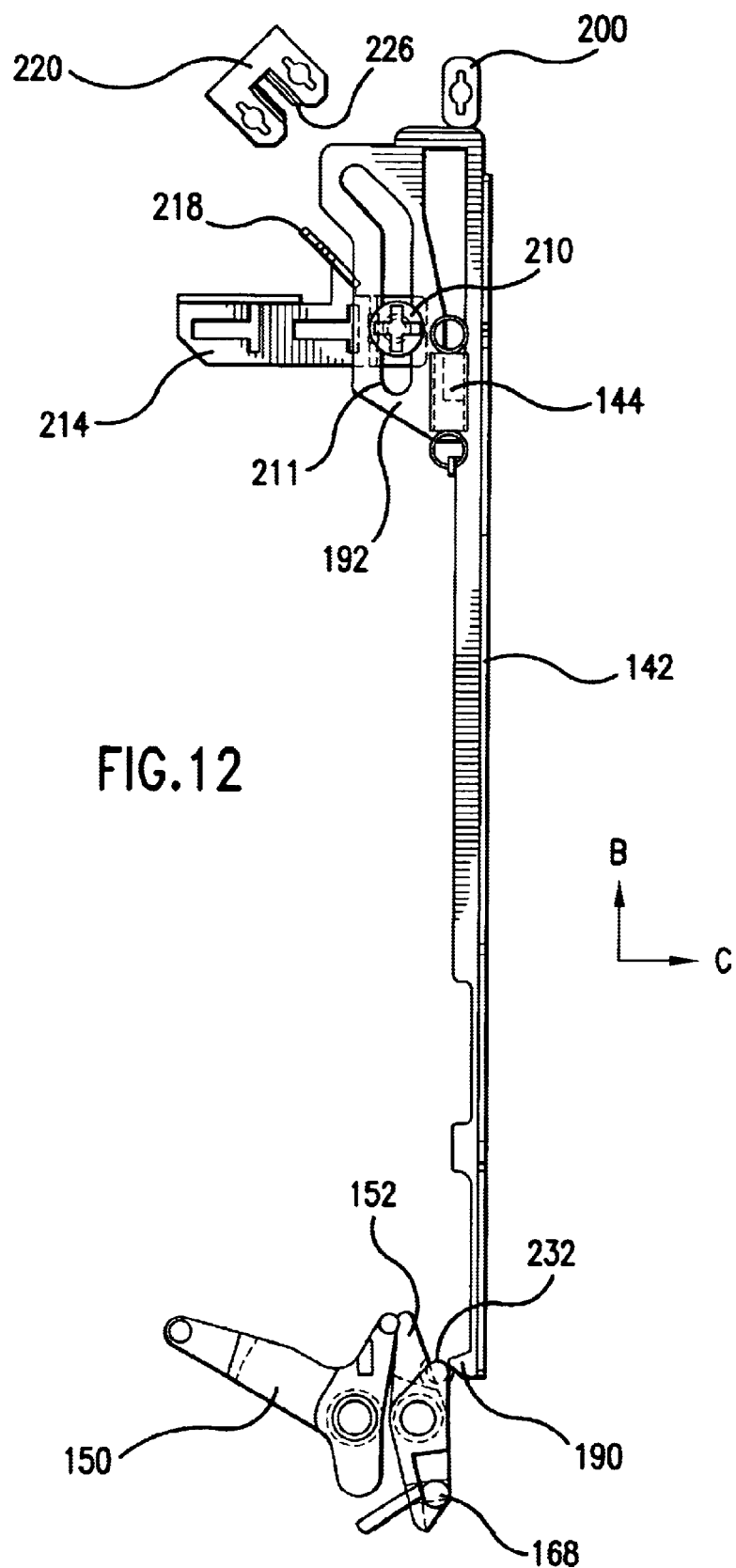

Continuing to refer to FIG. 11, as the slide 142 travels in the direction of the arrow B (i.e., travels rearwardly), the lateral slide member 214 will travel along a portion of the guide slot 194 of the slide 142. In particular, as the slide 142 moves in the direction of the arrow B, the rounded guide element 210 of the slide member 214 will simultaneously travel along the angled section 198 of the guide slot 194, causing the slide 214 to move laterally in the direction of the arrow C. This lateral displacement of the slide 214 will cause the elongated guide element 218 to exit the slot 228. Movement of the guide element 218 is usually at a 45 degree angle. Once the guide element 210 reaches the straight section 196 of the slot 194, the slide member 214 will no longer experience any further displacement in any direction, because at this time the slide 142 (and its slot 194) will continue to move in the direction of the arrow B (with the guide element 210 being generally stationary) until the front end 211 of the slot 194 abuts (or is adjacent) the guide element 210. FIG. 12 illustrates the guide element 210 adjacent the front end 211 of the slot 194. Thus, the front end 211 of the slot 194 defines the limit or extent to which the slide 142 can travel in the direction of the arrow B. At this time, the spring member 144 would have also been completely compressed, and the hooked end 190 of the slide 142 is now positioned adjacent the end 232 of the second arm 152 that is opposite to the rounded post 168. Throughout this action, the slide 142 can travel in the direction of the arrow B without any displacement from the chassis 129.

When the locking and ejection mechanism is in the position shown in FIG. 12, the tray 122 can be further pulled out from the housing 123 to a disk-change position by the user. When the tray 122 is set at the disk-change position, the tray 122 is completely outside the confines of the housing 123 and the disk on the tray 122 can be removed and replaced with a new one.

Figure 10:
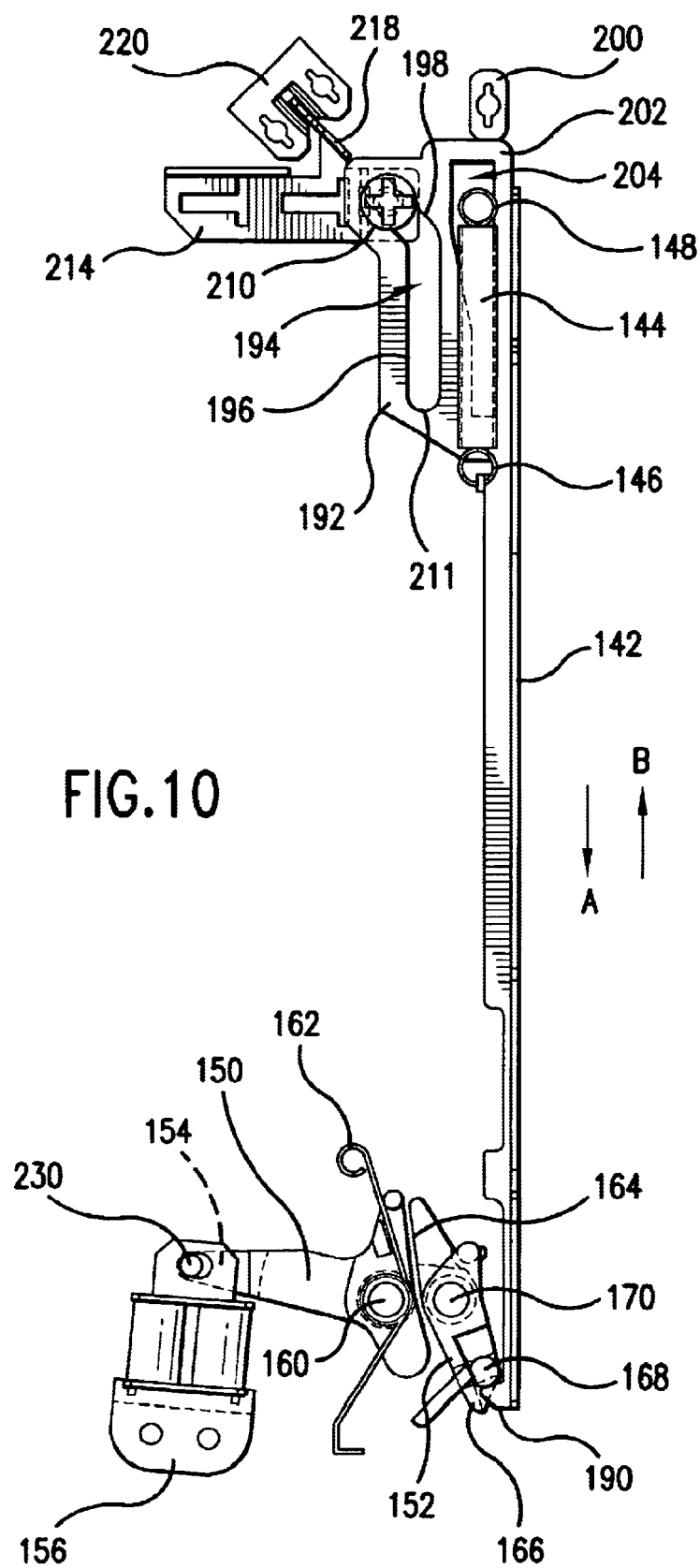
FIG. 10 is a top plan view of the locking and ejection mechanism of FIG. 9.

To lock the tray 122 back into the housing 123, the user merely pushes the tray 122 in the direction of the arrow B against the normal bias of the spring member 144 until the rounded post 168 travels past the hooked end 190 and engages the hooked end 190, as shown in FIG. 10. When the rounded post 168 travels past the hooked end 190, the normal counter-clockwise bias of the spring 234 will place the rounded post 168 in the path of the hooked end 190 to facilitate their engagement, which locks the tray 122 inside the housing 123. As the tray 122 is pushed in the direction of the arrow B, the slide 142 (and its slot 194) will move in the direction of the arrow A with respect to the opposing movement direction of the chassis 129 (with the guide element 210 being generally stationary) until the guide element 210 reaches the angled section 198. At this point, further movement of the slide 142 in the direction of the arrow A will cause the slide member 214 to move laterally in the direction of the arrow D, and the elongated guide element 218 to enter the slot 228.

Thus, the locking and ejection mechanism of the present invention minimizes the transfer of vibrations by providing the locking point for the tray 122 at a location that does not directly couple or attach to the housing 123. As a result, the built-up forces (including the normal bias of the ejection forces) that result at this locking point will remain internal, and will not be translated to the housing 123 and beyond to the outside environment. In addition, the locking and ejection mechanism of the present invention effectively locks the tray 122 inside the housing 123, while at the same facilitates smooth and effective ejection of the tray 122.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A disk drive, comprising:
   a housing having an opening through which a disk can be inserted;
   a tray having a chassis secured to the tray, the tray and the chassis being housed inside the housing, the chassis having a rear edge and a front adjacent the opening;
   a slide mechanism that is positioned between the chassis and the tray, and which is movable independently from the chassis, the slide mechanism having a front end;
   a locking and ejection mechanism that includes a first part that is secured to the front of the chassis and a second part that is secured to the front end of the slide mechanism;
   a guide assembly secured along the rear edge of the chassis, and coupled to the slide mechanism for guiding the movement of the slide mechanism;
   wherein the tray is locked inside the housing when the first part and second part engage each other, and the tray is ejected from the housing when engagement between the first part and second part is released.

2. The disk drive of claim 1, wherein the first part includes a pivoting arm having a post, and the second part includes a hooked end of the slide mechanism that engages the post.

3. The disk drive of claim 2, wherein the pivoting arm is a first pivoting arm, and wherein the first part further includes a second pivoting arm that engages the first pivoting arm, and a solenoid that is coupled to the second pivoting arm.

4. The disk drive of claim 3, wherein the first part further includes a biasing element that normally biases the first pivoting arm in a first direction that engages the hooked end.

5. The disk drive of claim 1, wherein the first and second parts of the locking and ejection mechanism are independent of the housing.

6. The disk drive of claim 1, wherein the slide mechanism includes a biasing member that normally biases the slide mechanism towards the rear of the housing to create an internal force that is independent of the housing.

7. The disk drive of claim 6, wherein the internal force causes the tray to be ejected from the housing when engagement between the first part and second part is released.

8. The disk drive of claim 1, wherein the slide mechanism has a rear end, and wherein the disk drive further includes a stop element secured to the housing for defining a stop point for the rear end of the slide mechanism.

9. The disk drive of claim 1, further including a guide slot that is secured to the housing and which receives a portion of the guide assembly.

10. A disk drive, comprising:
    a housing;
    a tray having a chassis secured to the tray, the tray and the chassis being housed inside the housing;
    a first slide mechanism that is positioned between the chassis and the tray, and which is movable independently from the chassis;
    a locking and ejection mechanism that includes a first part that is secured to the chassis and a second part that is secured to the first slide mechanism;
    a second slide mechanism secured to the chassis, and coupled to the first slide mechanism for gliding the movement of the slide mechanism;
    wherein the tray is locked inside the housing when the first part and second part engage each other, and the tray is ejected from the housing when engagement between the first part and second part is released; and
    wherein the second slide mechanism moves in a direction that is generally perpendicular to the movement of the first slide mechanism.

11. The disk drive of claim 10, wherein first slide element includes a guide slot, and further including a guide element positioned on the second slide mechanism, with the guide element retained for slidable movement inside the guide slot.

12. A disk drive, comprising:
    a housing having an opening through which a disk can be inserted;
    a tray having a chassis secured to the tray, the tray and the chassis being housed inside the housing, the chassis having a rear edge and a front adjacent the opening;
    a slide mechanism that is positioned between the chassis and the tray, and which is movable independently from the chassis;
    a locking and ejection mechanism that includes:
       a first pivoting arm and a second pivoting arm that are secured to the chassis, the first and second pivoting arms engaging each other, the first pivoting arm having a post positioned adjacent the front of the chassis;

a hooked front end of the slide mechanism that engages the post; and a guide assembly secured along the rear edge of the chassis, and coupled to the slide mechanism for guiding the movement of the slide mechanism;

wherein the tray is locked inside the housing when the hooked front end engages a portion of the first pivoting arm, and the tray is ejected from the housing when engagement between the hooked end and the portion of the first pivoting arm is released.

13. The disk drive of claim 12, wherein the first and second pivoting arms, and the slide mechanism and its hooked end, are all independent of the housing.

14. The disk drive, comprising:

housing;

a tray having a chassis secured to the tray, the tray and the chassis being housed inside the housing;

a first slide mechanism that is positioned between the chassis and the tray, and which is movable independently from the chassis; and a locking and ejection mechanism that includes:
a first pivoting arm and a second pivoting arm that are secured to the chassis, the first and second pivoting arms engaging each other, the first pivoting arm having a post;
a hooked end of the first slide mechanism that engages the post; and
a second slide mechanism secured to the rear of the chassis, and coupled to the first slide mechanism for guiding the movement of the first slide mechanism;

wherein the tray is locked inside the housing when the hooked end engages a portion of the first pivoting arm, and the tray is ejected from the housing when engagement between the hooked end and the portion of the first pivoting arm is released; and wherein the second slide mechanism moves in a direction that is generally perpendicular to the movement of the first slide mechanism.

15. The disk drive of claim 14, wherein first slide element includes a guide slot, and wherein the guide assembly includes a guide element positioned on the second slide mechanism, with the guide element retained for slidable movement inside the guide slot.

16. A method of locking and ejecting a tray from a housing of a disk drive, comprising:

providing a slide mechanism that is positioned between the chassis and the tray, and which is movable independently from the chassis;

providing a locking and ejection mechanism that includes a first part that is secured to the front of the chassis and a second part that is secured to a front end of the slide mechanism;

causing the first part and second part to engage with each other to lock the tray inside the housing;

creating an internal force when the first part and second part engage each other, the internal force being independent from the housing; and releasing the first part and the second part, whereby the internal force ejects the tray from the front of the housing.

17. The method of claim 16, wherein the step of creating an internal force includes:

providing the slide mechanism with a biasing member that normally biases the slide mechanism towards the rear of the housing to create the internal force.

18. The method of claim 16, wherein the step of releasing the first part and the second part includes:

causing the slide mechanism to move in a direction opposite to that of the chassis.

\* \* \* \* \*